(12) United States Patent  
Aridome

(10) Patent No.: US 10,189,464 B2  
(45) Date of Patent: Jan. 29, 2019

(54) BATTERY SYSTEM

(71) Applicant: TOYOTA JIDOSHA KABUSHIKI KAISHA, Toyota-shi, Aichi-ken (JP)

(72) Inventor: Koji Aridome, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 208 days.

(21) Appl. No.: 15/241,559

(22) Filed: Aug. 19, 2016

(65) Prior Publication Data

US 2017/0057486 A1  Mar. 2, 2017

(30) Foreign Application Priority Data

Aug. 25, 2015  (JP) .................................. 2015-165726

(51) Int. Cl.
*B60W 20/13* (2016.01)
*B60K 6/445* (2007.10)
(Continued)

(52) U.S. Cl.
CPC .............. *B60W 20/13* (2016.01); *B60K 6/445* (2013.01); *B60L 11/123* (2013.01); *B60L 11/14* (2013.01); *B60L 11/1861* (2013.01); *B60L 11/1862* (2013.01); *B60L 11/1864* (2013.01); *B60W 10/06* (2013.01); *B60W 10/08* (2013.01); *B60W 10/26* (2013.01); *B60W 30/192* (2013.01); *B60L 2260/26* (2013.01); *B60L 2260/44* (2013.01); *B60W 2510/244* (2013.01); *B60W 2710/06* (2013.01); *B60W 2710/08* (2013.01);
(Continued)

(58) Field of Classification Search
CPC ...... B60W 20/13; B60W 10/06; B60W 10/08; B60W 10/26; B60W 30/192; B60W 2510/244; B60W 2710/06; B60W 2710/08; B60W 2710/244; B60K 6/445; B60L 11/1862; B60L 11/1864; B60L 11/1859–11/1861; B60L 11/123; B60L 11/14; B60L 2260/26; B60L 2260/44; B60Y 2400/3086; Y02T 10/6239; Y02T 10/6269; Y10S 903/907
USPC ..... 701/22; 180/65.1, 65.21, 65.265, 65.275, 180/65.28, 65.285, 65.29; 903/907
See application file for complete search history.

(56) References Cited

U.S. PATENT DOCUMENTS 9,849,869 B2 * 12/2017 Frank .................... B60W 20/10
2007/0068714 A1 * 3/2007 Bender .................... B60K 6/26
180/65.29

(Continued)

FOREIGN PATENT DOCUMENTS

JP  5149989 B2  12/2012

*Primary Examiner* — Bao Long T Nguyen
(74) *Attorney, Agent, or Firm* — Sughrue Mion, PLLC

(57) ABSTRACT

A battery system includes an electricity storage device including a plurality of battery units. The electronic control device is configured to switch a travel mode of the vehicle between a CD mode and a CS mode. The electronic control device is configured to calculate a vehicle state of charge at a higher value than an average state of charge when the average state of charge is higher than a threshold value, and calculate the vehicle state of charge at a lower value than the average state of charge when the average state of charge is lower than the threshold value. The threshold value is set at a lower value than a center value between an upper limit value and a lower limit value of the vehicle state of charge.

9 Claims, 11 Drawing Sheets

(51) Int. Cl.
   *B60L 11/18* (2006.01)
   *B60W 10/26* (2006.01)
   *B60W 30/192* (2012.01)
   *B60W 10/06* (2006.01)
   *B60W 10/08* (2006.01)
   *B60L 11/12* (2006.01)
   *B60L 11/14* (2006.01)

(52) U.S. Cl.
   CPC .................. *B60W 2710/244* (2013.01); *B60Y 2400/3086* (2013.01); *Y02T 10/6239* (2013.01); *Y02T 10/6269* (2013.01); *Y10S 903/907* (2013.01)

(56) References Cited

U.S. PATENT DOCUMENTS

| | | | |
|---|---|---|---|
| 2012/0041630 A1 | 2/2012 | Yamamoto et al. | |
| 2014/0067175 A1* | 3/2014 | Cho | B60L 11/14 701/22 |
| 2014/0229043 A1* | 8/2014 | Frank | B60W 20/20 701/22 |
| 2014/0339891 A1* | 11/2014 | Ohkawa | H01M 10/44 307/9.1 |
| 2015/0006001 A1* | 1/2015 | Kawata | B60K 6/48 701/22 |
| 2015/0232082 A1* | 8/2015 | Frank | B60W 20/10 701/22 |
| 2018/0118187 A1* | 5/2018 | Frank | B60W 20/10 |

* cited by examiner

BATTERY SYSTEM

CROSS REFERENCE TO RELATED APPLICATIONS

The disclosure of Japanese Patent Application No. 2015-165726 filed on Aug. 25, 2015 including the specification, drawings and abstract is incorporated herein by reference in its entirety.

BACKGROUND

1. Field

This disclosure relates to a battery system installed in a vehicle that is capable of traveling using power from at least one of an engine and a motor-generator.

2. Description of Related Art

Japanese Patent No. 5149989 discloses a hybrid vehicle that is capable of switching between electric travel, in which an engine is stopped so that the vehicle travels using power from a motor-generator, and hybrid travel, in which the vehicle travels using power from both the engine and the motor-generator. In this hybrid vehicle, either a charge depleting (CD) mode or a charge sustaining (CS) mode is selected as a control mode in accordance with a state of charge (SOC) of an electricity storage device that exchanges power with the motor-generator. The CD mode is a control mode in which driving of the engine (hybrid travel) is prohibited in order to maintain the SOC of the electricity storage device within a predetermined control range. The CS mode is a control mode in which driving of the engine (hybrid travel) is permitted in order to maintain the vehicle SOC within the predetermined control range. As a result, greater priority is given to electric travel over hybrid travel in the CD mode than in the CS mode.

In the hybrid vehicle disclosed in Japanese Patent No. 5149989, the CD mode is selected until the SOC of the electricity storage device falls to a predetermined value, and when the SOC of the battery falls to the predetermined value, the CD mode is switched to the CS mode.

When the electricity storage device is a battery pack formed by connecting a plurality of battery units in series, differences may occur among the SOCs of the respective battery units due to various factors such as individual differences among the respective battery units and variation in a degree of deterioration therein. Therefore, to prevent over-discharge of the respective battery units, an overall SOC (also referred to hereinafter as a "vehicle SOC") of the electricity storage device may be calculated in consideration of the SOC (also referred to hereafter as a "minimum unit SOC") of the battery unit having the lowest SOC. For example, the vehicle SOC may be calculated such that when the minimum unit SOC is at a lower limit value, the vehicle SOC also takes a lower limit value.

In the hybrid vehicle disclosed in Japanese Patent No. 5149989, however, when the effect of the minimum unit SOC on the vehicle SOC is set to be excessively large in order to prevent over-discharge, the vehicle SOC is calculated at a lower value than necessary relative to an actual overall amount of power stored in the electricity storage device at a point where the vehicle SOC falls to a predetermined value. As a result, the CD mode may be switched to the CS mode earlier than necessary, leading to a reduction in an electric travel distance.

SUMMARY

The present disclosure provides a method of calculating a vehicle state of charge (SOC) so as to maximize an electric travel distance while preventing over-discharge of respective battery units in a case where an electricity storage device is a battery pack formed by connecting a plurality of battery units in series.

An exemplary battery system according to the present disclosure may be a battery system installed in a vehicle. The vehicle comprises a motor-generator and an internal combustion engine. The vehicle is configured to switch between electric travel and hybrid travel. During electric travel, an engine is stopped such that the vehicle travels using power from the motor-generator. During hybrid travel, the vehicle travels using power from both the engine and the motor-generator. The battery system comprises an electricity storage device and an electronic control device. The electricity storage device comprises a plurality of battery units connected in series. The electricity storage device is configured to receive power from the motor-generator and to supply power to the motor-generator. The electronic control device is configured to calculate a vehicle SOC and an average SOC. The vehicle SOC is a ratio of a remaining amount of power of the electricity storage device to a total amount of power that can be charged to the electricity storage device. The average SOC is an average of a maximum unit SOC and a minimum unit SOC among a plurality of unit SOCs corresponding respectively to each battery unit of the plurality of battery units. The electronic control device is configured to switch a travel mode of the vehicle between a charge depleting (CD) mode and a charge sustaining (CS) mode. The CD mode is a travel mode in which electric travel is performed by stopping the engine so that the power of the electricity storage device is consumed preferentially over fuel in the engine. The CS mode is a travel mode in which an amount of power stored in the electricity storage device is maintained within a predetermined range by switching between electric travel and hybrid travel as required. The electronic control device is configured to cause the vehicle to travel in the CD mode when the vehicle SOC is higher than a predetermined value, and to switch from the CD mode to the CS mode and cause the vehicle to travel in the CS mode when the vehicle SOC falls below the predetermined value. The electronic control device is configured to calculate the vehicle SOC at a higher value than the average SOC when the average SOC is higher than a threshold value, and to calculate the vehicle SOC at a lower value than the average SOC when the average SOC is lower than the threshold value. The threshold value is set at a lower value than a center value between an upper limit value and a lower limit value of the vehicle state of charge.

According to this configuration, when the average SOC is lower than the threshold value, the vehicle SOC is calculated at a lower value than the average SOC (in other words, a value close to the minimum unit SOC). As a result, over-discharge of the respective battery units can be prevented more easily than when the vehicle SOC is calculated at a higher value than the average SOC. When the average SOC is higher than the threshold value, on the other hand, the vehicle SOC is calculated at a higher value than the average SOC (in other words, a value close to the maximum unit SOC). As a result, the effect of the minimum unit SOC on the vehicle SOC can be mitigated (reduced). The CD mode is thus prevented from being switched to the CS mode earlier than necessary. In the CS mode, driving of the engine (hybrid travel) is permitted in order to maintain the vehicle SOC within a control range, whereas in the CD mode, driving of the engine (hybrid travel) is prohibited in order to maintain the vehicle SOC within the predetermined control range. As a result, greater priority is given to electric travel over hybrid travel in the CD mode than in the CS mode. Hence, by preventing the CD mode from being switched to the CS mode earlier than necessary, an electric travel distance can be increased. Further, the "threshold value" at which the method of calculating the vehicle SOC is switched is set at a lower value than the center value of the vehicle SOC. Therefore, the effect of the minimum unit SOC on the vehicle SOC can be mitigated likewise when the "predetermined value" is set at a lower value than the center value of the vehicle SOC (when the CD mode is switched to the CS mode in a lower region than the center value of the vehicle SOC in order to extend the electric travel distance). As a result, a method of calculating the vehicle SOC with which the electric travel distance can be increased while preventing over-discharge of the respective battery units can be provided.

The electronic control device may be configured to calculate a difference between the maximum unit SOC and the minimum unit SOC. The electronic control device may be configured to increase the threshold value as the difference between the maximum unit SOC and the minimum unit SOC increases. For example, the electronic control device may be configured to increase the threshold value up to the center value as the difference between the maximum unit SOC and the minimum unit SOC increases According to this configuration, the threshold value is set at a larger value when the difference between the maximum unit SOC and the minimum unit SOC is large. As a result, an overall amount of power remaining in the electricity storage device when the vehicle SOC falls to the threshold value can be prevented from becoming extremely small.

The electronic control device may be configured to calculate the vehicle SOC using a first calculation formula when the average SOC is higher than the threshold value and using a second calculation formula when the average SOC is lower than the threshold value. The first calculation formula is a formula according to which the vehicle SOC takes the upper SOC limit value when the maximum unit SOC is at the upper SOC limit value and the vehicle SOC takes the threshold value when the average SOC is at the threshold value. The second calculation formula is a formula according to which the vehicle SOC takes the threshold value when the average SOC is at the threshold value and the vehicle SOC takes the lower SOC limit value when the minimum unit SOC is at the lower SOC limit value.

According to this configuration, the vehicle SOC takes the upper SOC limit value when the maximum unit SOC is at the upper SOC limit value. Therefore, charging of the electricity storage device can be stopped before the vehicle SOC reaches the upper SOC limit value, and as a result, overcharging of the respective battery units can be prevented. Further, the vehicle SOC takes the lower SOC limit value when the minimum unit SOC is at the lower SOC limit value. Therefore, discharge of the electricity storage device can be stopped before the vehicle SOC reaches the lower SOC limit value, and as a result, over-discharge of the respective battery units can be prevented.

An exemplary method of operating a battery system according to the present disclosure may be used to operate a battery installed in a vehicle. The vehicle comprises a motor-generator and an internal combustion engine. The vehicle is configured to switch between electric travel in which the vehicle uses power from the motor-generator but not the engine and hybrid travel in which the vehicle uses power from both the motor-generator and the engine. The battery system comprises an electricity storage device and an electronic control device. The electricity storage device comprises a plurality of battery units connected in series. The electricity storage device is configured to receive power from the motor-generator and to supply power to the motor-generator. The method comprises calculating a vehicle state of charge (SOC) and an average SOC using the electronic control device, the vehicle SOC being a ratio of a remaining amount of power of the electricity storage device to a total amount of power that can be charged to the electricity storage device, and the average SOC being an average of a maximum unit SOC and a minimum unit SOC among a plurality of SOCs corresponding respectively to each battery unit of the plurality of battery units. The method further comprises switching a travel mode of the vehicle between a CD mode and a CS mode using the electronic control device, the CD mode being a travel mode in which electric travel is performed, and the CS mode being a travel mode in which an amount of power stored in the electricity storage device is maintained within a predetermined range by switching between electric travel and hybrid travel. The method further comprises causing the vehicle to travel in the CD mode when the vehicle SOC is higher than a predetermined value, and switching from the CD mode to the CS mode and causing the vehicle to travel in the CS mode when the vehicle SOC falls below the predetermined value. The method further comprises calculating the vehicle SOC at a higher value than the average SOC when the average SOC is higher than a threshold value, and calculating the vehicle SOC at a lower value than the average SOC when the average SOC is lower than the threshold value, the threshold value being set at a value lower than a center value of an upper limit value and a lower limit value of the vehicle SOC.

The method may further comprise calculating a difference between the maximum unit SOC and the minimum unit SOC using the electronic control device, and increasing the threshold value using the electronic control device as the difference between the maximum unit SOC and the minimum unit SOC increases. The threshold value may be increased up to the center value as the difference between the maximum unit SOC and the minimum unit SOC increases.

The method may further comprise calculating the vehicle SOC using a first calculation formula when the average SOC is higher than the threshold value and using a second calculation formula when the average SOC is lower than the threshold value. The first calculation formula is a formula according to which the vehicle SOC equals the upper SOC limit value when the maximum unit SOC is at the upper SOC limit value and the vehicle SOC equals the threshold value when the average SOC is at the threshold value. The second calculation formula is a formula according to which the vehicle SOC equals the threshold value when the average SOC is at the threshold value and the vehicle SOC takes the lower SOC limit value when the minimum unit SOC is at the lower SOC limit value.

The method of operating a battery system according to the present exemplary embodiment may be executed repeatedly at predetermined period intervals.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
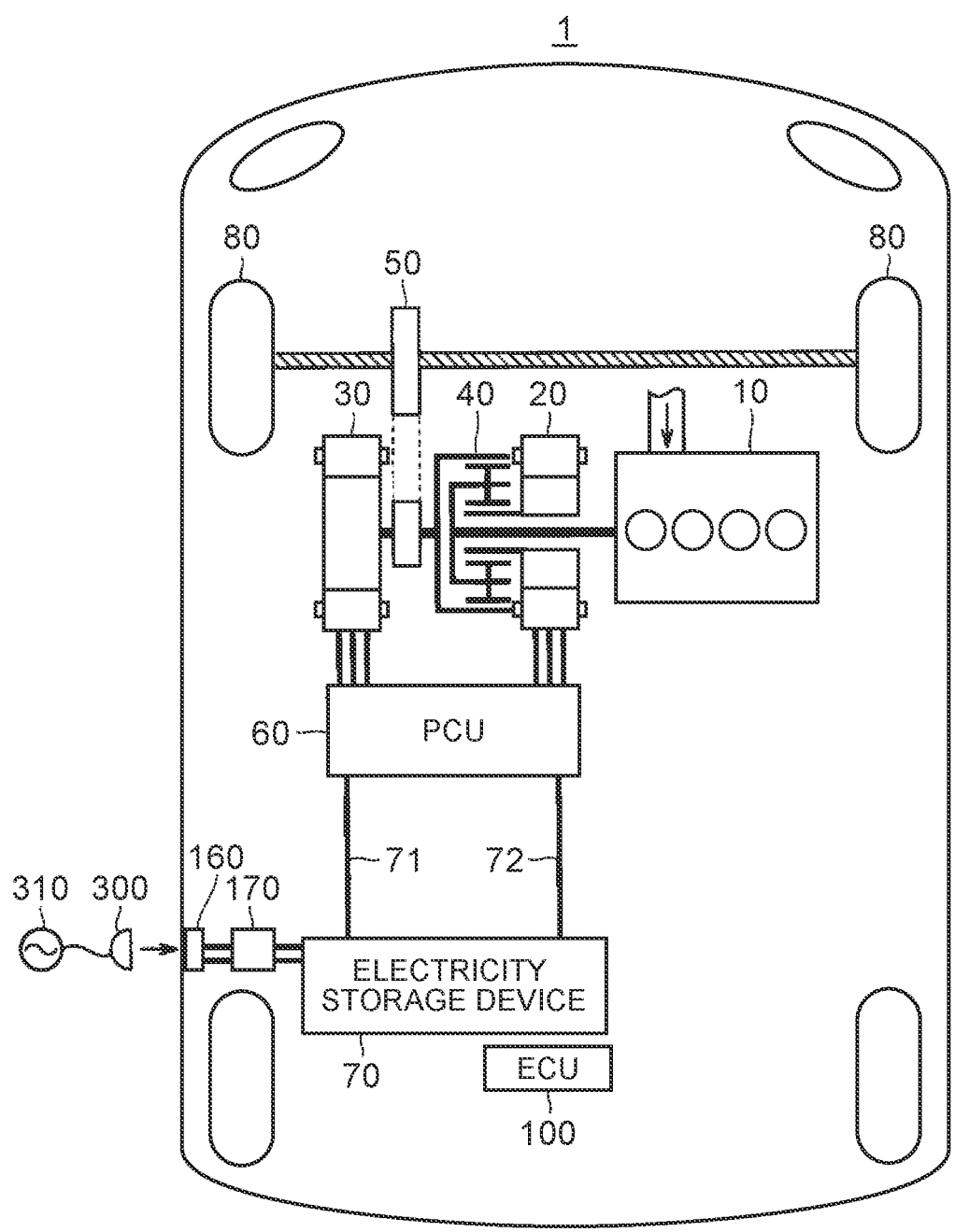
FIG. 1 is an overall block diagram of a vehicle.

Exemplary embodiments of the present disclosure will be described in detail below with reference to the drawings. Note that in the drawings, identical or corresponding parts have been allocated identical reference numerals, and description thereof will not be repeated.

[Overall Configuration of Vehicle]

FIG. 1 is an overall block diagram of a vehicle 1 having a battery system according to an exemplary embodiment. The vehicle 1 includes an engine 10, a first motor-generator (MG) 20, a second MG 30, a power split device 40, a reduction gear 50, a power control unit (PCU) 60, an electricity storage device 70, drive wheels 80, and an electronic control unit (ECU) 100.

The vehicle 1 is a hybrid vehicle that travels using driving force from at least one of the engine 10 and the second MG 30. The vehicle 1 is capable of switching between travel using power from the second MG 30 but not power from the engine 10 (hereinafter referred to as "EV travel"), and travel using power from both the engine 10 and the second MG 30 (hereinafter referred to as "HV travel").

The engine 10, the first MG 20, and the second MG 30 are coupled to one another via the power split device 40. The engine 10 of the present exemplary embodiment is an internal combustion engine that generates driving force for rotating a crankshaft from combustion energy generated when an air-fuel mixture of air and fuel is burned. The engine 10 is controlled by a control signal from the ECU 100.

The first MG 20 and the second MG 30 are motor-generators driven by alternating currents. The first MG 20 generates power using power from the engine 10, which is distributed thereto by the power split device 40. The second MG 30 generates driving force using at least one of power supplied from the electricity storage device 70 and power generated by the first MG 20. The driving force generated by the second MG 30 is transmitted to the drive wheels 80. During a braking operation of the vehicle 1, the second MG 30 is driven by the drive wheels 80 so as to operate as a generator. As a result, the second MG 30 functions as a regenerative brake. Regenerative power generated by the second MG 30 is supplied to the electricity storage device 70 via the PCU 60.

The power split device 40 comprises a planetary gear including a sun gear, a pinion gear, a carrier, and a ring gear. The pinion gear is engaged with the sun gear and the ring gear. The carrier supports the pinion gear rotatably, and is coupled to the crankshaft of the engine 10. The sun gear is coupled to a rotary shaft of the first MG 20. The ring gear is coupled to a rotary shaft of the second MG 30 and the reduction gear 50.

The PCU 60 is controlled by a control signal from the ECU 100. The PCU 60 converts direct current power supplied thereto from the electricity storage device 70 via power lines 71, 72, into alternating current power by which the first MG 20 and the second MG 30 can be driven. The PCU 60 outputs the converted alternating current power to the first MG 20 and the second MG 30, respectively. As a result, the first MG 20 and the second MG 30 are driven by power stored in the electricity storage device 70. It should be appreciated that the PCU 60 is also capable of converting alternating current power generated by the first MG 20 and the second MG 30 into direct current power, and charging the electricity storage device 70 with the converted direct current power.

The electricity storage device 70 is a direct current power supply that stores power for driving the first MG 20 and the second MG 30, and includes a secondary battery such as a nickel hydrogen secondary battery or a lithium ion secondary battery, for example. The electricity storage device 70 outputs a high voltage exceeding 200 V, for example.

Figure 2:
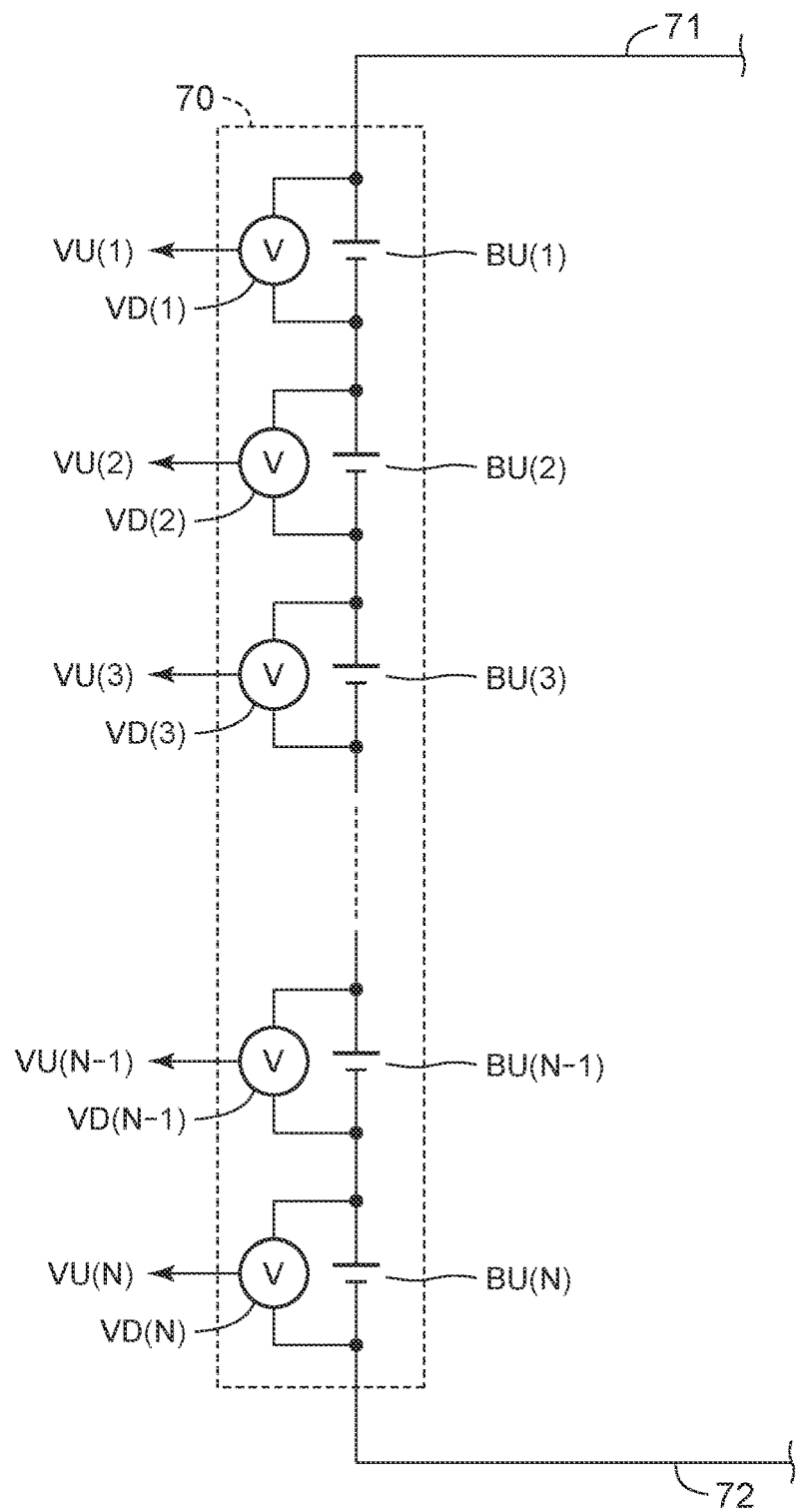
FIG. 2 is a schematic view showing an internal configuration of an electricity storage device.

FIG. 2 is a schematic view showing an internal configuration of the electricity storage device 70. The electricity storage device 70 is a battery pack formed by connecting a plurality of battery units BU in series. In the example shown in FIG. 2, N (where N is a natural number no lower than 2) battery units BU(1) to BU(N) are connected in series. Each battery unit BU is formed from one or a plurality of battery cells. Normally, the respective battery units BU are formed from an identical number of battery cells so as to output equal voltages. Note that hereinafter, the term "the battery units BU" will be used to refer to the battery units BU (1) to BU (N) collectively.

Voltage detectors VD(1) to VD(N) are provided to correspond respectively to the battery units BU(1) to BU(N). The voltage detectors VD(1) to VD(N) detect respective output voltages VU(1) to VU(N) of the battery units BU(1) to BU(N), and output detection results to the ECU 100.

Returning to FIG. 1, the vehicle 1 includes a charging port 160 and a charger 170 for charging the electricity storage device 70 with power from an external power supply 310. That is, in the present exemplary embodiment, the vehicle 1 is a so-called plug-in hybrid vehicle (PHV).

The charging port 160 is a power interface that receives power from the external power supply 310. When the electricity storage device 70 is charged with power from the external power supply 310, a connector 300 for supplying the vehicle with power from the external power supply 310 is connected to the charging port 160.

The charger 170 is electrically connected to the charging port 160 and the electricity storage device 70. The charger 170 charges the electricity storage device 70 by converting the power supplied from the external power supply 310 into power that can be charged to the electricity storage device 70 on the basis of a control signal from the ECU 100.

Further, the vehicle 1 is provided with a plurality of sensors that detect various physical quantities required to control the vehicle 1, such as an accelerator depression amount (an amount by which an accelerator pedal is depressed by a user) and a vehicle speed. These sensors output detection results to the ECU 100.

A central processing unit (CPU) and a memory are built into the ECU 100. The ECU 100 executes predetermined calculation processing on the basis of information from the respective sensors and information stored in the memory, and controls respective devices of the vehicle 1 on the basis of calculation results.

The ECU 100 calculates an overall state of charge (SOC) of the electricity storage device 70 on the basis of the detection results from the voltage detectors VD(1) to VD(N) and so on. The SOC typically represents a ratio of a remaining capacity to a fully charged capacity. The overall SOC of the electricity storage device 70 will also be referred to hereinafter as the "vehicle SOC". A method of calculating the vehicle SOC is the principal feature of the present exemplary embodiment. The method of calculating the vehicle SOC will be described in more detail below.

The ECU 100 controls the respective devices so as to cause the vehicle 1 to travel in one of two control modes, namely a charge sustaining mode (hereinafter referred to as a "CS mode") and a charge depleting mode (hereinafter referred to as a "CD mode").

The CS mode is a mode for keeping the vehicle SOC (the amount of power stored in the electricity storage device 70) stable within a predetermined control range while satisfying a user requested power by switching between EV travel and HV travel as required. In the CS mode, the engine 10 is started when the vehicle SOC falls below a lower limit value of the control range, whereupon the electricity storage device 70 is charged with power that is generated by the first MG 20 using power from the engine 10. When the vehicle SOC rises above the lower limit value of the control range, the engine 10 is stopped again. In other words, the CS mode is a mode in which driving of the engine 10 is permitted in order to maintain the vehicle SOC within the predetermined control range.

The CD mode is a mode for consuming power from the electricity storage device 70 (the vehicle SOC) preferentially over the fuel in the engine 10 by stopping the engine 10 and performing EV travel. The CD mode is a mode in which driving of the engine 10 is prohibited in order to maintain the vehicle SOC within the predetermined control range. Note, however, that when the user requested power exceeds a power that can be output by the second MG 30 (a power that can be output by the electricity storage device 70 (unit: watts)) in the CD mode, the ECU 100 satisfies the user requested power by starting the engine 10 in order to perform HV travel temporarily.

As described above, in the CS mode, driving of the engine 10 (HV travel) is permitted in order to maintain the vehicle SOC within the predetermined control range, whereas in the CD mode, driving of the engine 10 (HV travel) is prohibited in order to maintain the vehicle SOC within the predetermined control range. As a result, therefore, greater priority is given to EV travel over HV travel in the CD mode than in the CS mode.

Once the vehicle 1 starts to travel, the ECU 100 selects the CD mode until the vehicle SOC falls to a predetermined switch value D. In the CD mode, the engine 10 is stopped and EV travel is performed as long as the user requested power does not exceed the power that can be output by the second MG 30. As a result, power from the electricity storage device 70 is consumed preferentially over the fuel in the engine 10.

When, in the CD mode, the vehicle SOC falls to the switch value D, the ECU 100 switches the control mode from the CD mode to the CS mode.

When a PHV travels while consuming power from a battery preferentially over the fuel of an engine, an improvement in fuel efficiency may be achieved. In consideration of this point, in the vehicle 1 according to this embodiment, the switch value D (the vehicle SOC at which the CD mode is switched to the CS mode) is set at a lower value than a center value C between an upper limit value A and a lower limit value B of the vehicle SOC in order to enlarge a region in which travel is performed in the CS mode. For example, when the upper limit value A is 100% and the lower limit value B is 0%, the center value C is 50%, and therefore the switch value D is set at a lower value than 50% (30%, for example).

[Method of Calculating Vehicle SOC]

An exemplary method of calculating the vehicle SOC will now be described in detail. To facilitate description, a case in which the upper limit value A of the vehicle SOC is set at 100%, the lower limit value B is set at 0%, and the center value C is set at 50%, will be described below as an example.

In a battery pack such as the electricity storage device 70, differences may occur among the SOCs of the respective battery units BU due to various factors such as individual differences among the respective battery units BU, variation in a degree of deterioration among the respective battery units BU, replacement of a part of the battery units BU, and a temperature distribution through the electricity storage device 70. Therefore, to prevent over-discharge of the respective battery units BU, the vehicle SOC may be calculated such that when the SOC (also referred to hereinafter as a "minimum value Smin") of the battery unit BU having the lowest SOC falls to 0%, the vehicle SOC equals 0%. Further, to prevent overcharging of the respective battery units BU, the vehicle SOC may be calculated such that when the SOC (also referred to hereafter as a "maximum value Smax") of the battery unit BU having the highest SOC reaches 100%, the vehicle SOC equals 100%.

In consideration of the point described above, the vehicle SOC has conventionally been calculated using the following calculation formula:

$$\text{Vehicle SOC}=100\times 5\ \min/\{100-(Smax-Smin)\}$$

However, when the vehicle SOC is calculated using this calculation formula and a difference exists between the maximum value Smax and the minimum value Smin (in other words, when Smax−Smin>0), the vehicle SOC is calculated as a value that is closer to the minimum value Smin than to the maximum value Smax in a region where the vehicle SOC is lower than 50% (the center value C). In other words, the minimum value Smin has a greater effect on the vehicle SOC than the maximum value Smax.

In the vehicle 1 according to the present exemplary embodiment, as described above, the switch value D is set at a value (30%, for example) lower than 50% (the center value C) in order to enlarge the region in which travel is performed in the CS mode. Therefore, when the vehicle SOC is calculated using the above calculation formula, the effect of the minimum value Smin becomes greater than the effect of the maximum value Smax at a point where the vehicle SOC falls to the switch value D (30%). As a result, the CD mode is switched to the CS mode earlier than necessary.

Hence, the ECU 100 according to the present exemplary embodiment calculates an average value Smid (=(Smax+Smin)/2) of the maximum value Smax and the minimum value Smin as a value corresponding to an average value of the SOCs of the plurality of battery units BU, and modifies the formula for calculating the vehicle SOC according to whether or not the average value Smid is higher than the switch value D.

More specifically, when the average value Smid is higher than the switch value D, the ECU 100 sets an SOC(A) calculated using Equation (1) shown below, in which the switch value D, the maximum value Smax, and the minimum value Smin are used as parameters, as the vehicle SOC.

[Equation (1)]

$$SOC(A) = D + (100 - D) \times \frac{(S\max - D) - \left\{S\max - \frac{(S\max + S\min)}{2}\right\}}{(100 - D) - \left\{S\max - \frac{(S\max + S\min)}{2}\right\}} \quad (1)$$

By setting the SOC(A) calculated using Equation (1) as the vehicle SOC, the vehicle SOC equals 100% (the upper limit value A) when the maximum value Smax is at 100% (the upper limit value A), and the vehicle SOC equals the switch value D when the average value Smid is at the switch value D. Further, the vehicle SOC takes a higher value than the average value Smid.

When the average value Smid is lower than the switch value D, on the other hand, the ECU 100 sets an SOC(B) calculated using Equation (2) shown below, in which the switch value D, the maximum value Smax, and the minimum value Smin are used as parameters, as the vehicle SOC.

[Equation (2)]

$$SOC(B) = D \times \frac{\frac{(S\max + S\min)}{2} - \left\{\frac{(S\max + S\min)}{2} - S\min\right\}}{D - \left\{\frac{(S\max + S\min)}{2} - S\min\right\}} \quad (2)$$

By setting the SOC(B) calculated using Equation (2) as the vehicle SOC, the vehicle SOC equals the switch value D when the average value Smid is at the switch value D, and the vehicle SOC equals 0% (the lower limit value B) when the minimum value Smin is at 0% (the lower limit value B). Further, the vehicle SOC takes a lower value than the average value Smid.

Figure 3:
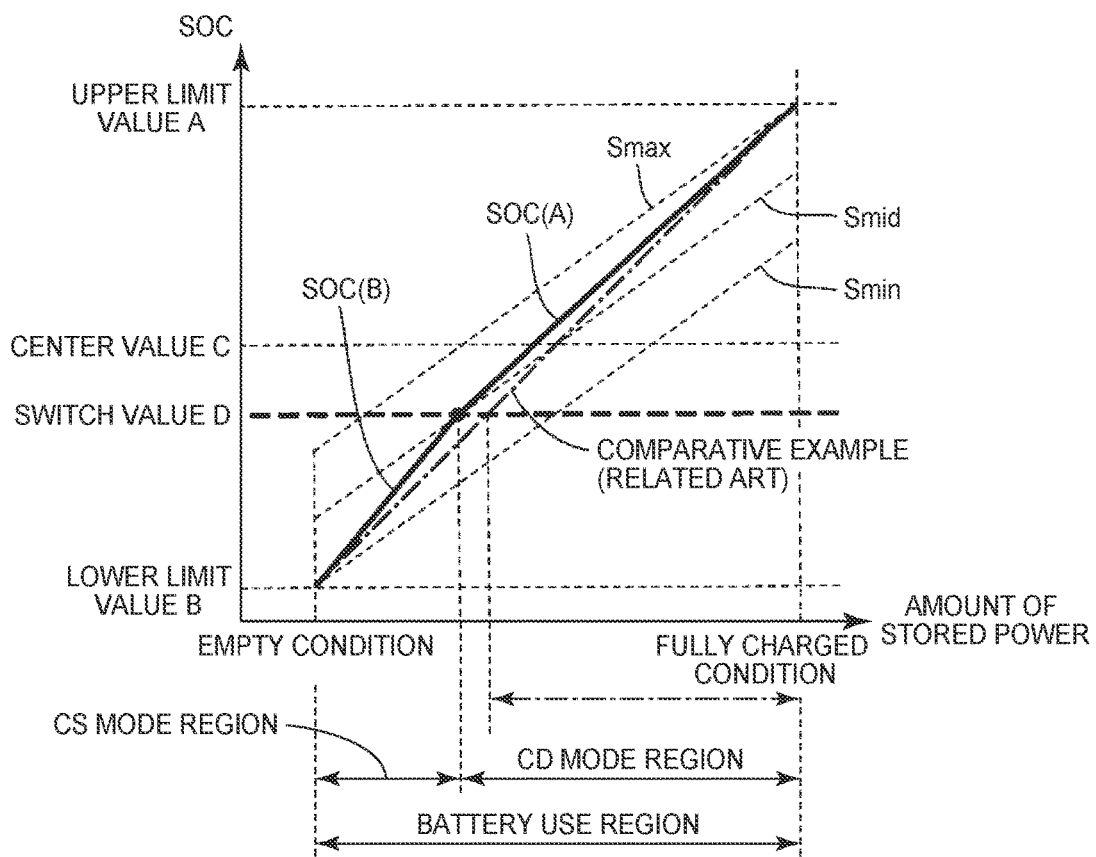
FIG. 3 is a schematic view showing a correspondence relationship between an amount of power stored in an electricity storage device and a vehicle SOC.

FIG. 3 is a schematic view showing correspondence relationships between the amount of power stored in the electricity storage device 70 and the vehicle SOCs (the SOC(A) and the SOC(B)) calculated by the ECU 100. In FIG. 3, the abscissa (x-axis) shows the amount of power stored in the electricity storage device 70, and the ordinate (y-axis) shows the vehicle SOC. FIG. 3 shows an example of a case in which a difference exists between the maximum value Smax and the minimum value Smin.

When the average value Smid of the maximum value Smax and the minimum value Smin is higher than the switch value D, the ECU 100 sets the SOC(A), calculated using Equation (1), as the vehicle SOC.

The SOC(A) takes the upper limit value A when the maximum value Smax is at the upper limit value A. Hence, charging of the electricity storage device 70 can be stopped before the SOC(A) reaches the upper limit value A, and as a result, overcharging of the respective battery units BU included in the electricity storage device 70 can be prevented.

Further, as the average value Smid decreases, the SOC(A) gradually approaches the average value Smid so that at the point where the average value Smid reaches the switch value D, the SOC(A) equals the switch value D. As a result, the effect of the minimum value Smin on calculation of the vehicle SOC at the point where the SOC(A) takes the switch value D can be suppressed in comparison with the related art.

More specifically, in the related art, vehicle SOC=100× Smin/{100−(Smax−Smin)} is set, and therefore, in the region where the vehicle SOC is lower than the center value C (50%), as shown by a dot-dash line in FIG. 3, the vehicle SOC takes a lower value than the average value Smid (in other words, a value closer to the minimum value Smin than to the maximum value Smax). Hence, at the point where the vehicle SOC falls to the switch value D, which is lower than the center value C, the vehicle SOC is calculated at a lower value than necessary relative to the overall amount of power stored in the electricity storage device 70. Accordingly, the vehicle SOC falls to the switch value D earlier than necessary, and as a result, the CD mode is switched to the CS mode earlier than necessary.

In the present exemplary embodiment, however, the SOC (A) calculated using Equation (1) is set as the vehicle SOC, and therefore the vehicle SOC can be set at the average value Smid of the maximum value Smax and the minimum value Smin even at the point where the vehicle SOC falls to the switch value D, which is lower than the center value C. Hence, the effect of the minimum value Smin on the vehicle SOC can be suppressed in comparison with the related art. Accordingly, the switch from the CD mode to the CS mode can be delayed in comparison with the related art, and as a result, the region in which travel is performed in the CD mode (a "CD mode region" in FIG. 3) can be enlarged.

When the average value Smid is lower than the switch value D, the ECU 100 sets the SOC(B) calculated using Equation (2) as the vehicle SOC, as described above. The SOC(B) equals the switch value D when the average value Smid is at the switch value D, and gradually decreases toward the minimum value Smin as the average value Smid decreases.

When the minimum value Smin reaches the lower limit value B, the SOC(B) equals the lower limit value B. Hence, discharge of the electricity storage device 70 can be stopped before the SOC(B) falls to the lower limit value B, and as a result, over-discharge of the respective battery units BU included in the electricity storage device 70 can be prevented.

Figure 4:
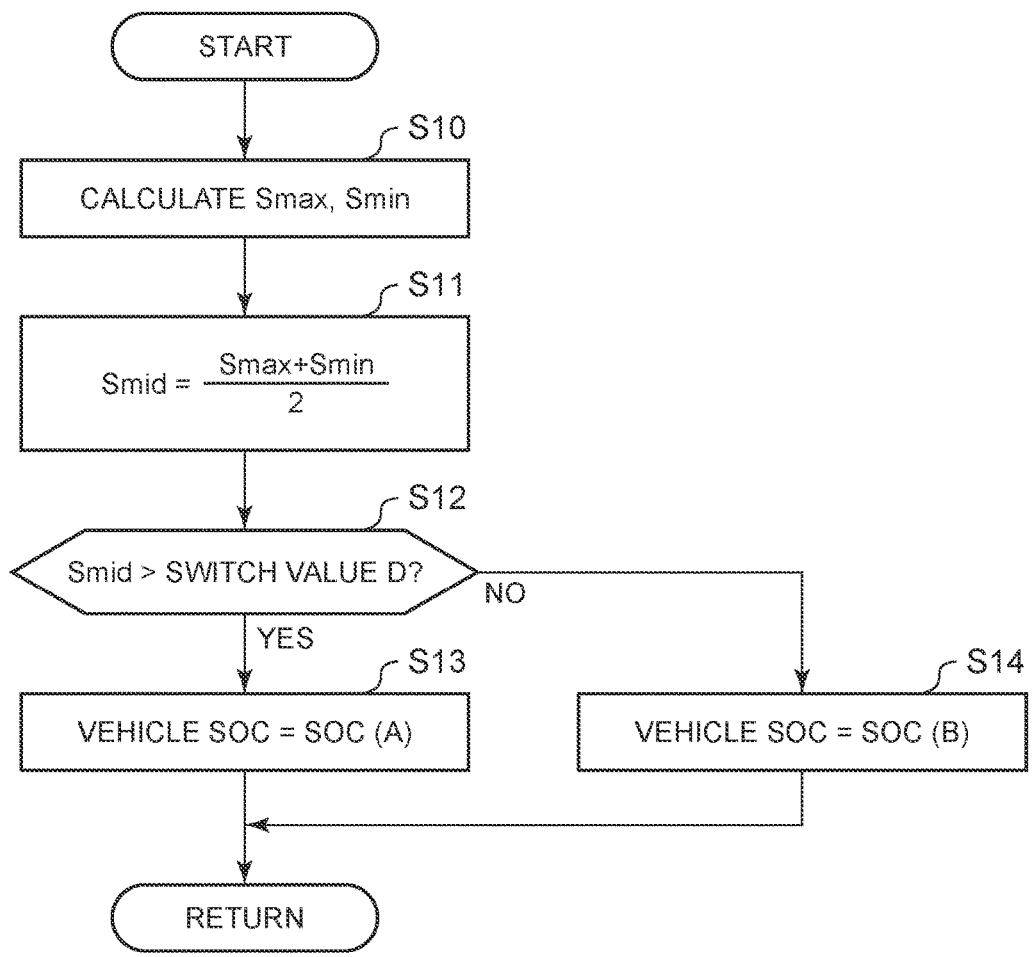
FIG. 4 is a flowchart showing processing procedures executed by an electronic control unit (ECU)

FIG. 4 is a flowchart showing processing procedures executed by the ECU 100 to calculate the vehicle SOC. This flowchart is executed repeatedly at predetermined period intervals.

In step S10, the ECU 100 calculates the maximum value Smax (the SOC of the battery unit BU having the highest SOC among the plurality of battery units BU) and the minimum value Smin (the SOC of the battery unit BU having the lowest SOC among the plurality of battery units BU). For example, the ECU 100 obtains the respective output voltages VU(1) to VU(N) of the battery units BU(1) to BU(N) from the voltage detectors VD(1) to VD(N), and calculates the respective SOCs of the battery units BU(1) to BU(N) on the basis of the obtained output voltages VU(1) to VU(N). The ECU 100 then sets the highest and the lowest of the calculated SOCs as the maximum value Smax and the minimum value Smin, respectively. It should be appreciated that the method of calculating the maximum value Smax and the minimum value Smin is not limited to this method.

In step S11, the ECU 100 calculates the average value Smid (=(Smax+Smin)/2) of the maximum value Smax and the minimum value Smin as a value corresponding to an average value of the SOCs of the plurality of battery units BU. In step S12, the ECU 100 determines whether or not the average value Smid is greater than the switch value D.

When the average value Smid is greater than the switch value D (YES at step S12), the ECU 100 calculates the SOC(A) using Equation (1) in step S13, and sets the calculated SOC(A) as the vehicle SOC.

When the average value Smid is less than the switch value D (NO at step S12), the ECU 100 calculates the SOC(B) using Equation (2) in step S14, and sets the calculated SOC(B) as the vehicle SOC.

FIGS. 5 to 8 are schematic views showing correspondence relationships between the amount of power stored in the electricity storage device 70 and the vehicle SOC in respective cases where the difference (also referred to hereinafter as the "SOC difference") between the maximum value Smax and the minimum value Smin is "nonexistent" (0%), "small" (15%, for example), "medium" (30%, for example), and "large" (45%, for example).

Figure 5:
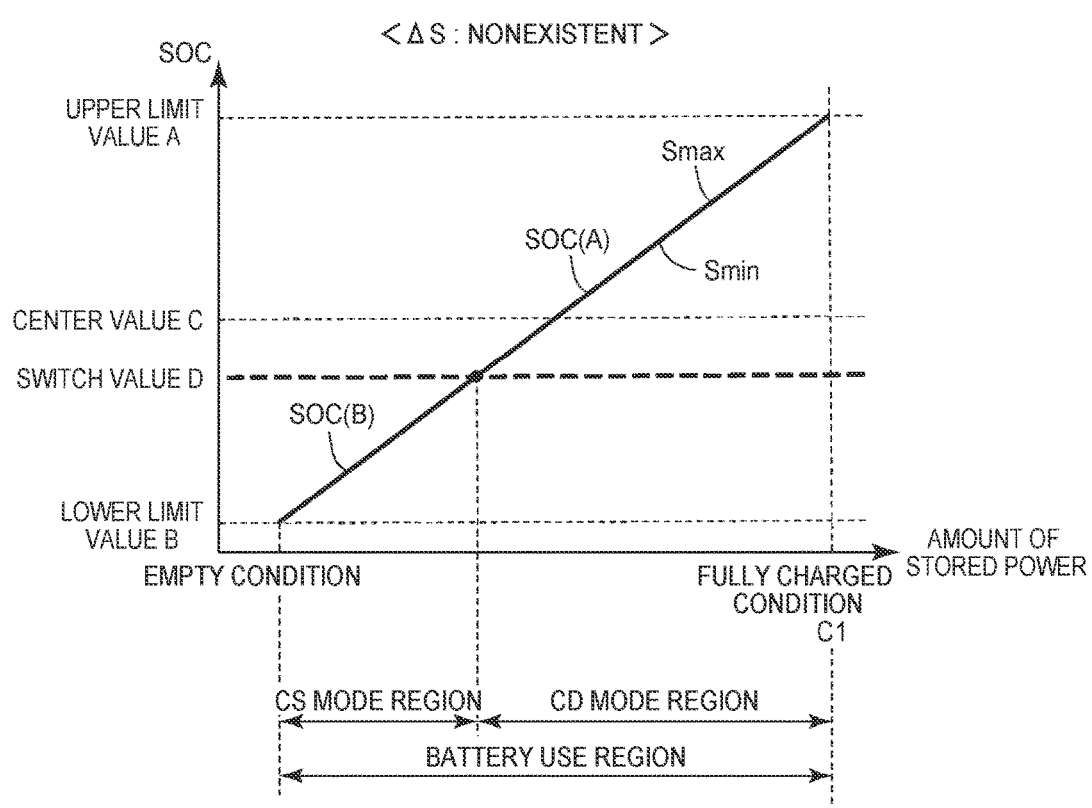
FIG. 5 is a schematic view showing a correspondence relationship between an amount of power stored in an electricity storage device and a vehicle SOC.

As shown in FIG. 5, when the SOC difference is nonexistent, the SOC(A) matches the maximum value Smax and the minimum value Smin, and therefore, when the vehicle SOC (the SOC(A)) is at the upper limit value A, the maximum value Smax and the minimum value Smin are also at the upper limit value A, indicating that all of the plurality of battery units BU are in a fully charged condition. Hence, an amount of stored power C1 in the fully charged condition in FIG. 5 (when the SOC difference is nonexistent) corresponds to a maximum amount. It should be appreciated that the SOC difference may be nonexistent when all of the plurality of battery units BU included in the electricity storage device 70 are new.

In cases where an SOC difference exists, when the vehicle SOC (the SOC(A)) is at the upper limit value A, the maximum value Smax is at the upper limit value A but the minimum value Smin is at a value that is lower than the upper limit value A by the SOC difference. Therefore, when an SOC difference exists, the amount of power stored in the electricity storage device 70 in the fully charged condition decreases as the SOC difference increases. In other words, an amount of stored power C2 in the fully charged condition of FIG. 6 (when the SOC difference is "small") is smaller than the amount of stored power C1 in the fully charged condition of FIG. 5 (when the SOC difference is nonexistent). Further, an amount of stored power C3 in the fully charged condition of FIG. 7 (when the SOC difference is "medium") is smaller than the amount of stored power C2 in the fully charged condition of FIG. 6. Furthermore, an amount of stored power C4 in the fully charged condition of FIG. 8 (when the SOC difference is "large") is smaller than the amount of stored power C3 in the fully charged condition of FIG. 7.

Hence, when an SOC difference exists, the amount of stored power in the fully charged condition decreases as the SOC difference increases. Therefore, as shown in FIGS. 5 to 8, a region (referred to hereinafter as a "battery use region") extending from a point at which the electricity storage device 70 is in the fully charged condition (a condition in which the vehicle SOC takes the upper limit value A) to a point at which the electricity storage device 70 is in an empty condition (a condition in which the vehicle SOC takes the lower limit value B) becomes steadily smaller as the SOC difference increases. As a result, the CD mode region may likewise become smaller as the SOC difference increases.

Figure 6:
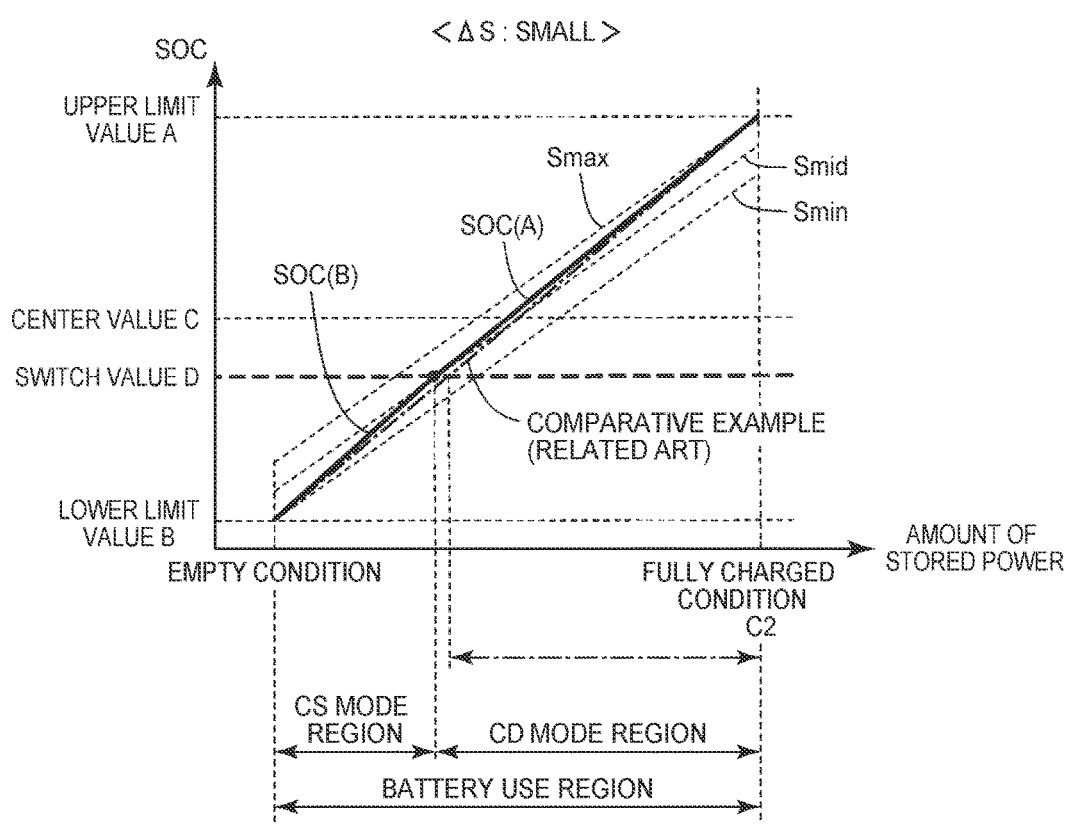
FIG. 6 is a schematic view showing a correspondence relationship between an amount of power stored in an electricity storage device and a vehicle SOC.
Figure 7:
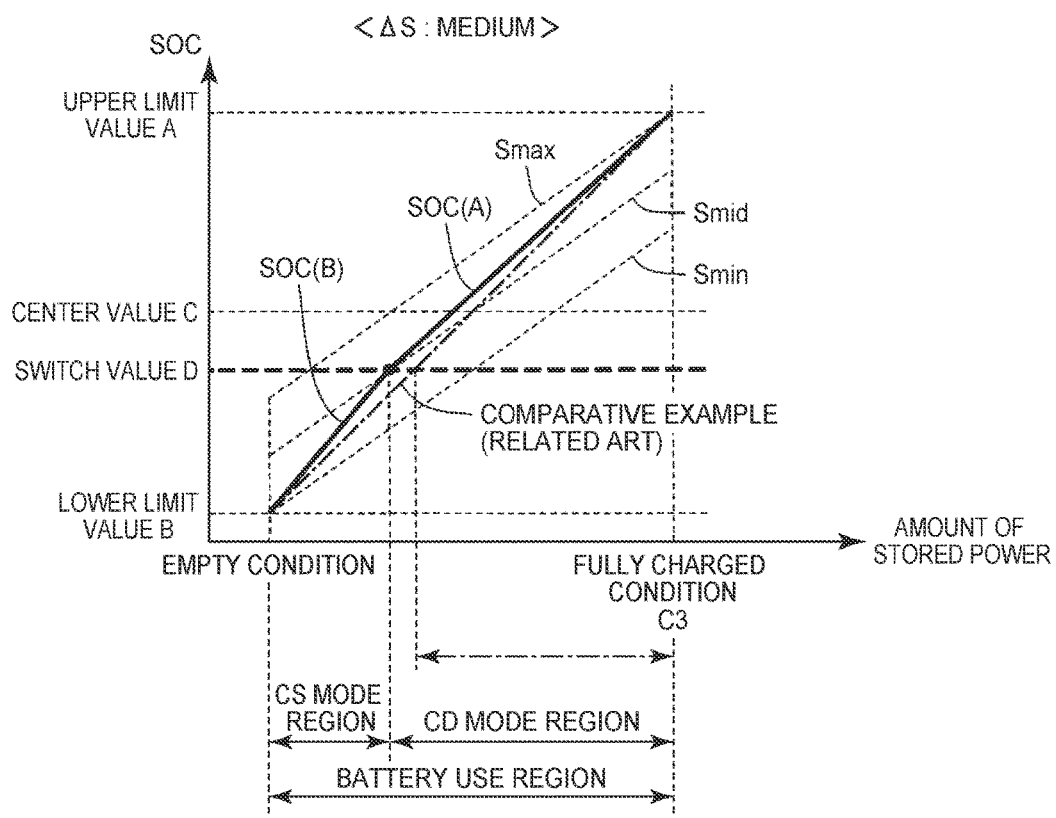
FIG. 7 is a schematic view showing a correspondence relationship between an amount of power stored in an electricity storage device and a vehicle SOC.
Figure 8:
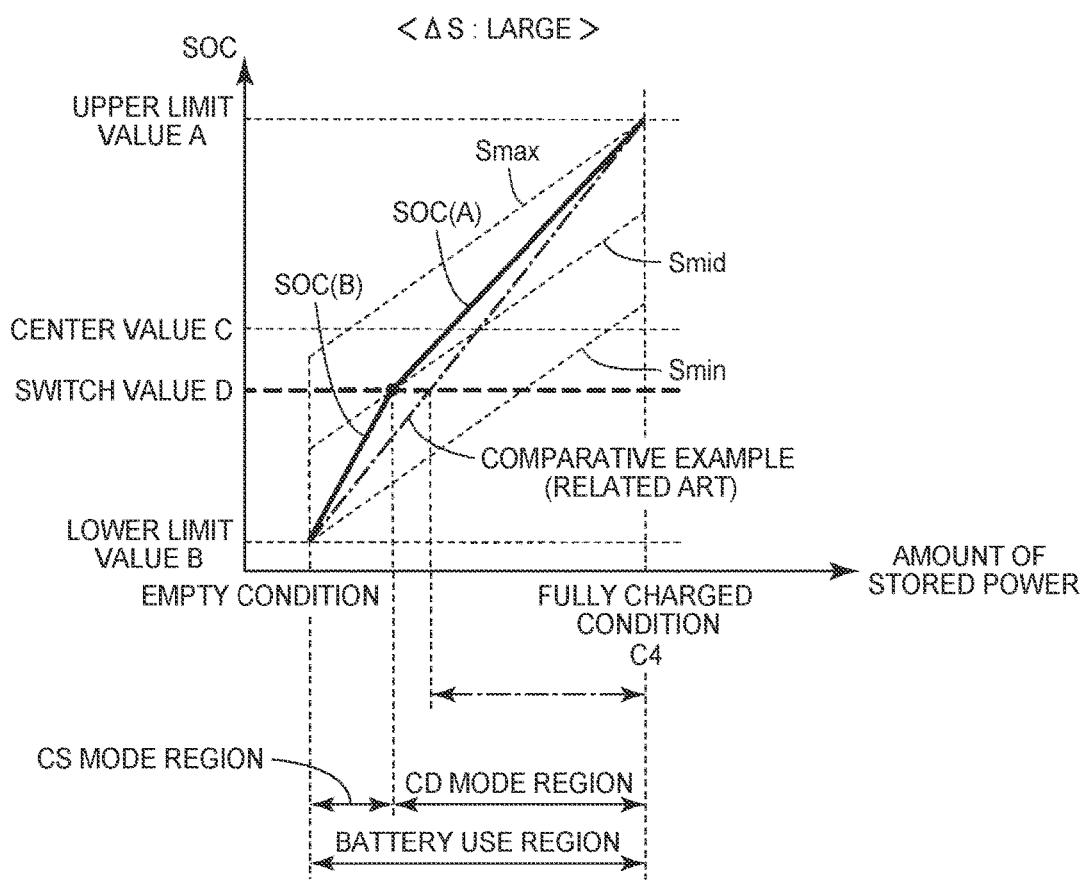
FIG. 8 is a schematic view showing a correspondence relationship between an amount of power stored in an electricity storage device and a vehicle SOC.

In the present exemplary embodiment, however, as described above, the effect of the minimum value Smin on the vehicle SOC at the point where the vehicle SOC falls to the switch value D is mitigated in comparison with the related art (see the dot-dash lines of FIGS. 6 to 8). Therefore, a time at which the vehicle SOC falls to the switch value D (a time at which to switch from the CD mode to the CS mode) can be delayed in comparison with the related art such that the CD mode region can be enlarged. As a result, the CD mode region in a case where an SOC difference exists can be brought as close as possible to the CD mode region in a case where an SOC difference does not exist.

As described above, the ECU 100 according to the present exemplary embodiment sets the SOC(A) calculated using Equation (1) as the vehicle SOC when the average value Smid of the maximum value Smax and the minimum value Smin is higher than the switch value D, and sets the SOC(B) calculated using Equation (2) as the vehicle SOC when the average value Smid is lower than the switch value D. In so doing, the vehicle SOC takes the upper limit value A when the maximum value Smax is at the upper limit value A, and takes the lower limit value B when the minimum value Smin is at the lower limit value B. Further, at the point where the vehicle SOC reaches the switch value D, the vehicle SOC is prevented from taking a lower value than the average value Smid. As a result, the CD mode region can be enlarged, enabling an increase in the EV travel distance, while preventing over-discharge and overcharging of the respective battery units BU.

It should be appreciated that the exemplary embodiment described above may be modified as follows, for example.

Modified Example

In the exemplary embodiment described above, the vehicle SOC at which the formula for calculating the vehicle SOC is switched from Equation (1) to Equation (2) is set at an identical value to the "switch value D" at which the control mode is switched from the CD mode to the CS mode.

As described above using FIGS. 5 to 8, however, the battery use region becomes smaller as the SOC difference increases. Therefore, when the formula for calculating the vehicle SOC is switched at the "switch value D", as in the above exemplary embodiment, in a case where the SOC difference is extremely large, the battery use region becomes extremely small, leading to a corresponding enlargement of the CD mode region, and as a result, the CS mode region may become extremely small.

In the present modified example, the point (also referred to hereinafter as a "changeover point E") at which to switch the formula for calculating the vehicle SOC is modified in accordance with the SOC difference. More specifically, the changeover point E is set at a larger value when the SOC difference is large than when the SOC difference is small.

Figure 9:
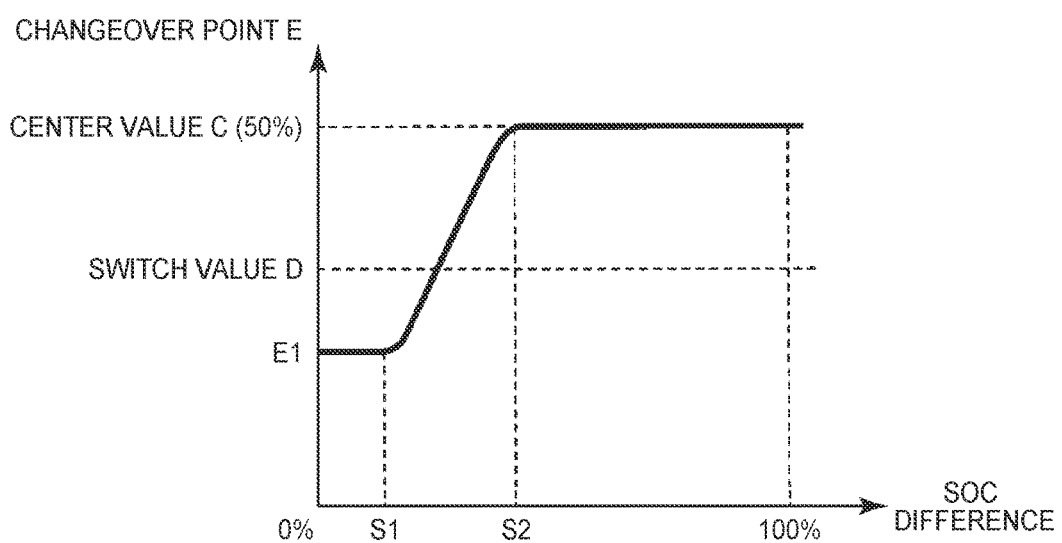
FIG. 9 is a view showing an example of a correspondence relationship between an SOC difference and a changeover point E.

FIG. 9 is a view showing an example of a correspondence relationship between the SOC difference and the changeover point E. As shown in FIG. 9, in a region where the SOC difference is smaller than a predetermined value S1, the changeover point E is fixed at a predetermined value E1 that is lower than the switch value D. In a region where the SOC difference increases from the predetermined value S1 to a predetermined value S2 (S2>S1), the changeover point E is increased from the predetermined value E1 to 50% (the center value C) in accordance with the increase in the SOC difference. In a region where the SOC difference exceeds the predetermined value S2, the changeover point E is fixed at 50% (the center value C).

When the average value Smid is larger than the changeover point E, the ECU 100 according to this modified example sets an SOC(A1) calculated using Equation (1.1), shown below, as the vehicle SOC, and when the average value Smid is smaller than the changeover point E, the ECU 100 sets an SOC(B1) calculated using Equation (2.1) as the vehicle SOC.

[Equation (1.1)]

$$SOC(A1) = E + (100 - E) \times \frac{(S\max - E) - \left\{S\max - \frac{(S\max + S\min)}{2}\right\}}{(100 - E) - \left\{S\max - \frac{(S\max + S\min)}{2}\right\}} \quad (1.1)$$

[Equation (1.2)]

$$SOC(B1) = E \times \frac{\frac{(S\max + S\min)}{2} - \left\{\frac{(S\max + S\min)}{2} - S\min\right\}}{E - \left\{\frac{(S\max + S\min)}{2} - S\min\right\}} \quad (2.1)$$

Equations (1.1) and (2.1) are obtained by modifying the "switch value D" in Equations (1) and (2) to the "changeover point E". More specifically, the SOC(A1) calculated using Equation (1.1) equals 100% (the upper limit value A) when the maximum value Smax is at 100% (the upper limit value A), and equals the changeover point E when the average value Smid is at the changeover point E. The SOC(B1) calculated using Equation (2.1) equals the changeover point E when the average value Smid is at the changeover point E, and equals 0% (the lower limit value B) when the minimum value Smin is at 0% (the lower limit value B).

Figure 10:
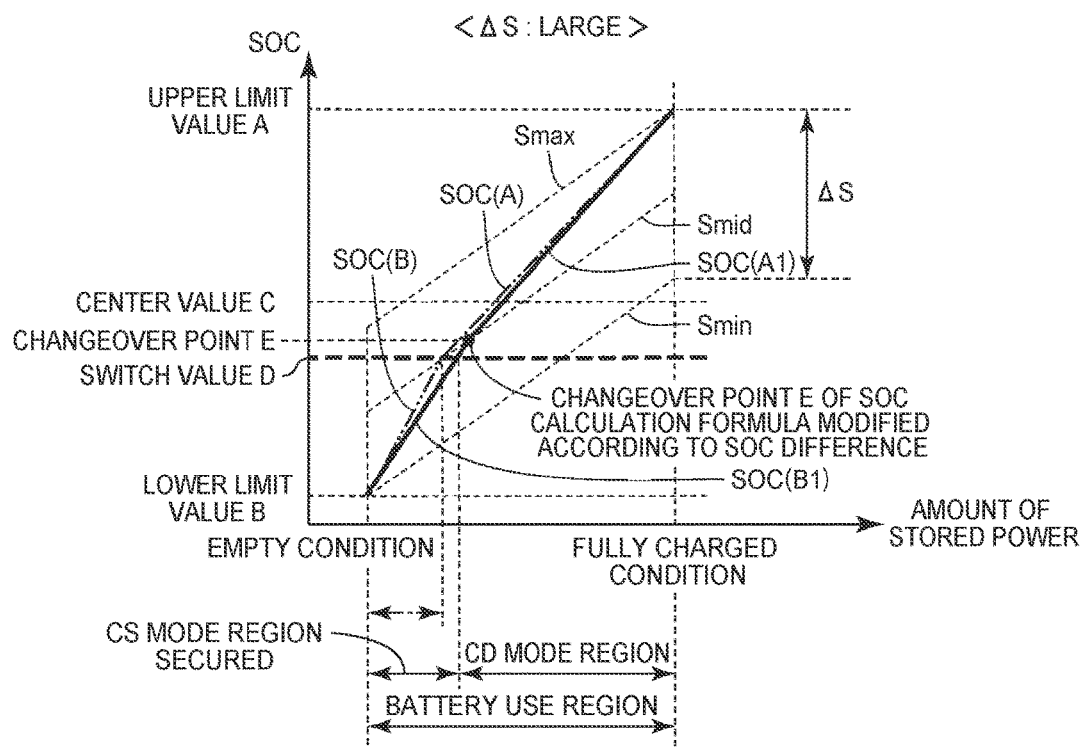
FIG. 10 is a schematic view showing a correspondence relationship between an amount of power stored in an electricity storage device and a vehicle SOC.

FIG. 10 is a schematic view showing an example of correspondence relationships between the amount of power stored in the electricity storage device 70 and the vehicle SOCs (the SOC(A1) and the SOC(B1)) calculated by the ECU 100 according to the present modified example. The example shown in FIG. 10 corresponds to a case in which the point at which to switch the formula for calculating the vehicle SOC is modified from the "switch value D" to the "changeover point E" when the SOC difference is "large", as shown in FIG. 8.

In the example shown in FIG. 10, the SOC difference is "large", and therefore the battery use region is small. In accordance with the "large" SOC difference, however, the changeover point E is set at a higher value than the switch value D, and therefore the vehicle SOC is modified from the SOC(A1) calculated using Equation (1.1) to the SOC(B1) calculated using Equation (2.1) before falling to the switch value D. Hence, as shown in FIG. 10, the vehicle SOC falls to the switch value D at an earlier time (a time at which a larger amount of stored power remains in the electricity storage device 70) than when the formula for calculating the vehicle SOC is switched at the switch value D (as shown by a dot-dot-dash line). Accordingly, the CD mode is switched to the CS mode at an earlier timing, and as a result, the CD mode region can be prevented from becoming extremely small.

Figure 11:
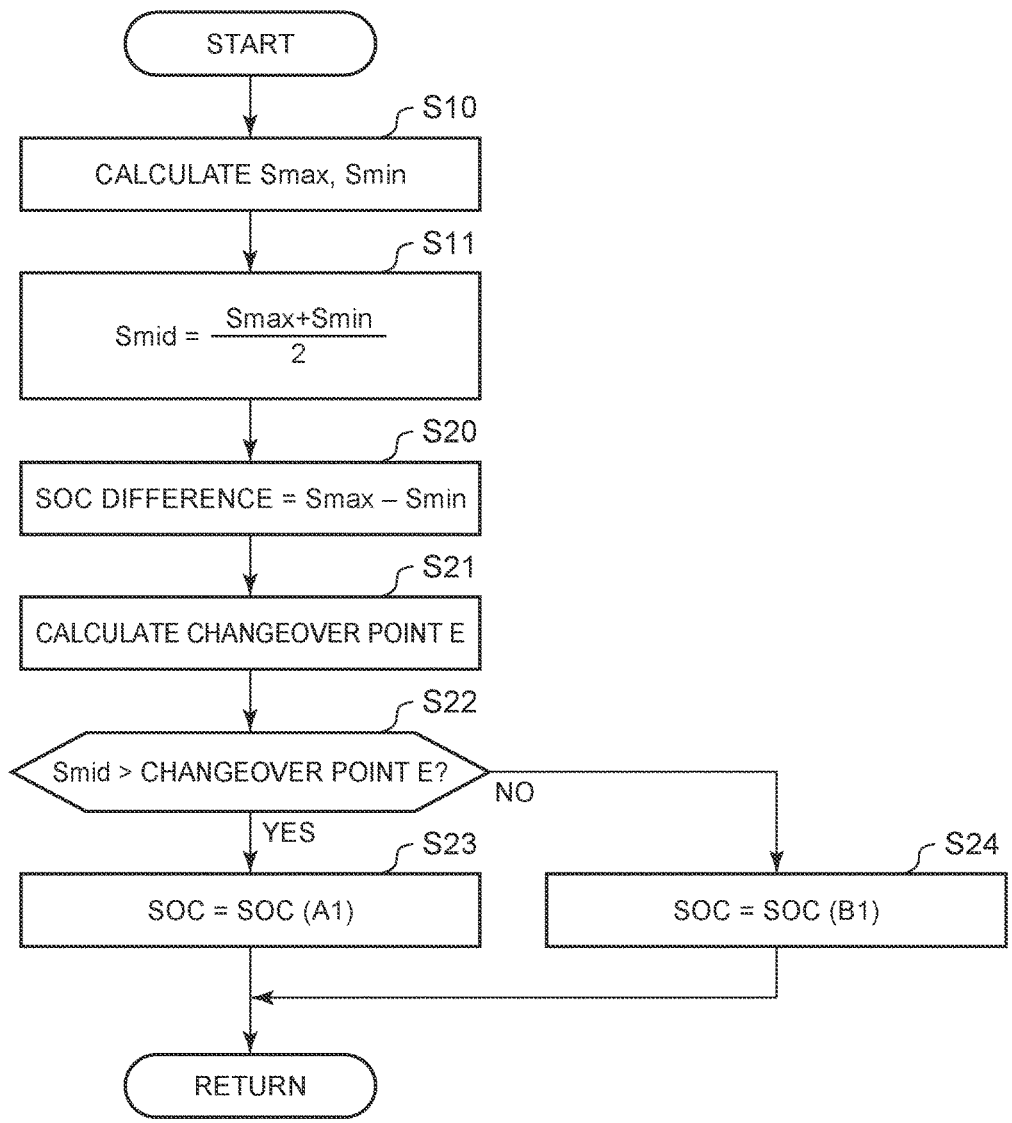
FIG. 11 is a flowchart showing processing procedures of an ECU.

FIG. 11 is a flowchart showing processing procedures executed by the ECU 100 to calculate the vehicle SOC according to the present modified example. It should be appreciated that of the steps shown in FIG. 11, steps having identical numerals to the steps shown in FIG. 4 have already been described, and therefore detailed descriptions thereof will not be repeated.

Following step S10 and step S11 (described above), in step S20, the ECU 100 calculates the SOC difference (=Smax−Smin). In step S21, the ECU 100 calculates the changeover point E corresponding to the SOC difference by referring to a map such as that shown in FIG. 9, described above.

In step S22, the ECU 100 determines whether or not the average value Smid is higher than the changeover point E.

When the average value Smid is higher than the changeover point E (YES at step S22), the ECU 100 calculates the SOC(A1) using Equation (1.1) in step S23, and sets the calculated SOC(A1) as the vehicle SOC.

When the average value Smid is lower than the changeover point E (NO at step S22), the ECU 100 calculates the SOC(B1) using Equation (2.1) in step S24, and sets the calculated SOC(B1) as the vehicle SOC.

In the present modified example, as described above, the "changeover point E" at which to switch the formula for calculating the vehicle SOC is modified to a larger value when the SOC difference is large than when the SOC difference is small. Therefore, the CD mode is switched to the CS mode at an earlier time than when the formula for calculating the vehicle SOC is switched at the switch value D, as in the above exemplary embodiment. As a result, the CD mode region can be prevented from becoming extremely small even when the SOC difference is large.

The embodiments disclosed herein are to be considered exemplary and non-limiting in all respects. The scope of this disclosure is defined by the scope of the claims rather than the above description, and equivalent definitions to the scope of the claims and all modifications within that scope are intended to be included therein.

An exemplary embodiment of the present disclosure may be summarized as follows: An ECU calculates an SOC of an electricity storage device that exchanges power with a motor-generator as a vehicle SOC, selects a CD mode until the vehicle SOC falls to a switch value, and switches from the CD mode to a CS mode when the vehicle SOC falls to the switch value. The electricity storage device is a battery pack including a plurality of battery units connected in series. When an average value of a maximum value and a minimum value of respective SOCs of the plurality of battery units is larger than the switch value, the ECU sets an SOC(A) that is larger than the average value as the vehicle SOC, and when the average value is smaller than the switch value, the ECU sets an SOC(B) that is smaller than the average value as the vehicle SOC. The switch value is set at a lower value than a center value between an upper limit value and a lower limit value of the vehicle SOC.

What is claimed is:

1. A battery system installed in a vehicle, the vehicle comprising:
   a motor-generator; and
   an internal combustion engine, the vehicle being configured to switch between electric travel in which the vehicle uses power from the motor-generator but not the internal combustion engine and hybrid travel in which the vehicle uses power from both the internal combustion engine and the motor-generator during the hybrid travel,
   the battery system comprising:
   an electricity storage device comprising a plurality of battery units connected in series, the electricity storage device being configured to receive power from the motor-generator and to supply power to the motor-generator; and an electronic control unit (ECU), the ECU being configured to:

calculate a vehicle state of charge (SOC) and an average SOC, the vehicle SOC being a ratio of a remaining amount of power of the electricity storage device to a total amount of power that can be charged to the electricity storage device, and the average SOC being an average of a maximum unit SOC and a minimum unit SOC among a plurality of unit SOCs corresponding respectively to each battery unit of the plurality of battery units, switch a travel mode of the vehicle between a charge depleting (CD) mode and a charge sustaining (CS) mode, the CD mode being a travel mode in which electric travel is performed, and the CS mode being a travel mode in which an amount of power stored in the electricity storage device is maintained within a predetermined range by switching between electric travel and hybrid travel, cause the vehicle to travel in the CD mode when the vehicle SOC is higher than a predetermined value, and switch from the CD mode to the CS mode and cause the vehicle to travel in the CS mode when the vehicle SOC falls below the predetermined value, and calculate the vehicle SOC at a higher value than the average SOC when the average SOC is higher than a threshold value, and calculate the vehicle SOC at a lower value than the average SOC when the average SOC is lower than the threshold value, and the threshold value being set at a lower value than a center value between an upper limit value and a lower limit value of the vehicle SOC.

2. The battery system according to claim 1, wherein the ECU is configured to calculate a difference between the maximum unit SOC and the minimum unit SOC, and the ECU is configured to increase the threshold value as the difference between the maximum unit SOC and the minimum unit SOC increases.

3. The battery system according to claim 2, wherein the ECU is configured to increase the threshold value up to the center value as the difference between the maximum unit SOC and the minimum unit SOC increases.

4. The battery system according to claim 1, wherein the ECU is configured to calculate the vehicle SOC using a first calculation formula when the average SOC is higher than the threshold value and using a second calculation formula when the average SOC is lower than the threshold value, the first calculation formula being a formula according to which the vehicle SOC equals the upper SOC limit value when the maximum unit SOC is at the upper SOC limit value and the vehicle SOC equals the threshold value when the average SOC is at the threshold value, and the second calculation formula being a formula according to which the vehicle SOC equals the threshold value when the average SOC is at the threshold value and the vehicle SOC equals the lower SOC limit value when the minimum unit SOC is at the lower SOC limit value.

5. A method of operating a battery system installed in a vehicle, the vehicle comprising a motor-generator and an internal combustion engine, the vehicle being configured to switch between electric travel in which the vehicle uses power from the motor-generator but not the internal combustion engine and hybrid travel in which the vehicle uses power from both the motor-generator and the internal combustion engine, the battery system comprising an electricity storage device and an electronic control unit (ECU), the electricity storage device comprising a plurality of battery units connected in series, the electricity storage device being configured to receive power from the motor-generator and to supply power to the motor-generator, the method comprising:

calculating a vehicle state of charge (SOC) and an average SOC using the ECU, the vehicle SOC being a ratio of a remaining amount of power of the electricity storage device to a total amount of power that can be charged to the electricity storage device, and the average SOC being an average of a maximum unit SOC and a minimum unit SOC among a plurality of SOCs corresponding respectively to each battery unit of the plurality of battery units;

switching a travel mode of the vehicle between a charge depleting (CD) mode and a charge sustaining (CS) mode using the ECU, the CD mode being a travel mode in which electric travel is performed, and the CS mode being a travel mode in which an amount of power stored in the electricity storage device is maintained within a predetermined range by switching between electric travel and hybrid travel;

causing the vehicle to travel in the CD mode when the vehicle SOC is higher than a predetermined value, and switching from the CD mode to the CS mode and causing the vehicle to travel in the CS mode when the vehicle SOC falls below the predetermined value; and calculating the vehicle SOC at a higher value than the average SOC when the average SOC is higher than a threshold value, and calculating the vehicle SOC at a lower value than the average SOC when the average SOC is lower than the threshold value, the threshold value being set at a value lower than a center value of an upper limit value and a lower limit value of the vehicle SOC.

6. The method of operating a battery system according to claim 5, further comprising:

calculating a difference between the maximum unit SOC and the minimum unit SOC using the ECU, and increasing the threshold value using the ECU as the difference between the maximum unit SOC and the minimum unit SOC increases.

7. The method of operating a battery system according to claim 6, further comprising:

increasing the threshold value up to the center value as the difference between the maximum unit SOC and the minimum unit SOC increases.

8. The method of operating a battery system according to claim 5, further comprising:

calculating the vehicle SOC using a first calculation formula when the average SOC is higher than the threshold value and using a second calculation formula when the average SOC is lower than the threshold value, the first calculation formula being a formula according to which the vehicle SOC equals the upper SOC limit value when the maximum unit SOC is at the upper SOC limit value and the vehicle SOC equals the threshold value when the average SOC is at the threshold value, and the second calculation formula being a formula according to which the vehicle SOC equals the threshold value when the average SOC is at the threshold value and the vehicle SOC takes the lower SOC limit value when the minimum unit SOC is at the lower SOC limit value.

9. The method of operating a battery system according to claim 5, wherein the method is executed repeatedly at predetermined period intervals.

* * * * *